United States Patent [19]

Baghdachi

[11] Patent Number: 4,812,524

[45] Date of Patent: * Mar. 14, 1989

[54] POLYUREA/POLYURETHANE ADHESIVE COMPOSITIONS

[75] Inventor: Jamil Baghdachi, Wayne, Pa.

[73] Assignee: Pony Industries, Inc., New York, N.Y.

[ * ] Notice: The portion of the term of this patent subsequent to Jan. 26, 2005 has been disclaimed.

[21] Appl. No.: 860,972

[22] Filed: May 8, 1986

[51] Int. Cl.[4] .................... C08G 18/62

[52] U.S. Cl. .................... 525/194; 156/331.4; 525/236; 528/61; 528/75

[58] Field of Search .................... 525/194, 236; 528/61, 528/75; 156/331.4

[56] References Cited

U.S. PATENT DOCUMENTS

| | | | |
|---|---|---|---|
| 3,333,015 | 7/1967 | Burke | 526/319 |
| 3,673,168 | 6/1972 | Burke | 525/191 |
| 3,714,110 | 1/1973 | Vendol et al. | 528/75 |
| 3,796,762 | 3/1974 | Vendol et al. | 526/319 |
| 3,987,012 | 10/1976 | Statton | 528/75 |

*Primary Examiner*—Maurice J. Welsh

*Attorney, Agent, or Firm*—J. R. Magnone; A. J. Good; R. Laddie Taylor

[57] ABSTRACT

Novel polyurea/polyurethane two-component adhesive compositions are disclosed which comprise the reaction product of (a) a blend of an amine terminated polybutadiene and a polyhydroxybutadiene with (b) an aliphatic or aromatic di- or polyisocyanate and optionally chain extenders, tackifiers, coupling agents fillers and curingly effective amounts of catalyst.

10 Claims, No Drawings

POLYUREA/POLYURETHANE ADHESIVE COMPOSITIONS

FIELD OF THE INVENTION

This application is related to application Ser. No. 789,996 filed Oct. 22, 1985 and now abandoned.

The present invention relates to novel two-component polyurea/polyurethane adhesive compositions which are heat curable. More particularly, it relates to two-component adhesives based on the reaction product of a blend of amine terminated polybutadiene compounds with polyhydroxybutadiene and a di- or polyisocyanate to provide a composition having excellent adhesion properties especially to oily and unprimed metal and glass substrates, as well as good hydrolytic stability, low moisture permeability, low temperature flexibility and high temperature servicability. The compositions may also contain chain extenders, tackifiers, coupling agents, various fillers, adhesion promoters and curingly effective amounts of a catalyst to enhance adhesion or provide additional properties.

BACKGROUND OF THE INVENTION

Various elastomeric polyurethane compositions useful as adhesives and sealants are available commercially. Generally these compositions comprise uncured natural or synthetic rubbers together with various curing agents and accelerators. Polyurethane adhesives are known and are widely used for bonding various metallic, plastic and glass substrates because of their good strength and versatility. Introduction of a urea linkage to a polyurethane formulation, as in the present invention, improves the adhesion as well as the physical properties. The urea linkage is hydrolylically stable and unaffected by a high concentration of water at elevated temperature. Urea bonds give sufficient cohesive strength, promote adhesion and give higher thermal stability to the polymers.

Japanese Kokai 60/90215 describes polyurethane aqueous dispersion adhesives prepared from a polybutadiene polyol, a diisocyanate, a diol containing ≧1 tertiary amino group and a quaternization agent to form an emulsion.

U.S. Pat. No. 4,515,933, May 7, 1985 discloses a one-component polyurethane adhesive composition comprising a secondary or tertiary aliphatic diisocyanate pre-polymer, a polyol compound, a chain extender of sucrose and sorbitol and an organometallic curing agent.

Processes for the preparation of the polyhydroxybutadiene employed in the reaactive blend of the instant invention are known in the art, and may be prepared, for example, by the methods described in U.S. Pat. Nos. 3,333,015, 3,673,168 and 3,796,762 all incorporated herein by reference.

The amine terminated polybutadienes employed in the reactive blends of the present invention may be prepared as set forth in the co-pending application Ser. No. 06/748,068 filed June 24, 1985 in the name of Harry R. Hinney and Jamil Baghdadchi entitled Amine Terminated Polybutadiene Compositions and Preparation Thereof, which application is incorporated herein by reference.

It is an object of the present invention to provide a novel two-component polyurea/polyurethane adhesive composition which is heat curable and has excellent adhesive properties.

It is another object to provide a process for bonding substrates with the polyurea/polyurethane adhesive by applying a wet film of adhesive between and in contact with the substrate and curing same at ambient or elevated temperature to form an exceptionally strong bond.

These and other objects and advantages of this invention will become apparent from the description of the invention which follows and from the claims.

DETAILED DESCRIPTION OF THE INVENTION

In accordance with the present invention, novel two-component polyurea/polyurethane adhesive compositions are provided which comprise the reaction product of (a) a blend of from about 5 to about 95 parts by weight based on the total weight of the blend of an amine terminated poly-

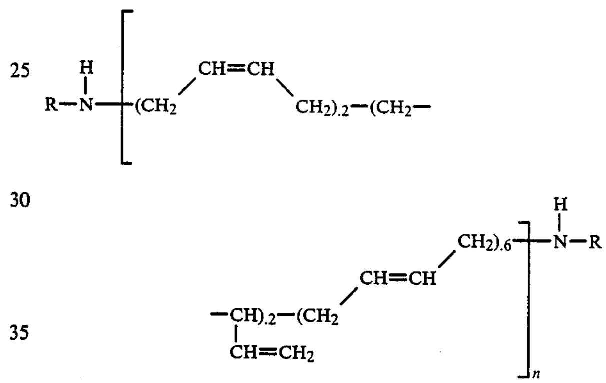

wherein R is hydrogen, a straight or branched chain alkyl group containing from 1 to 10 carbon atoms or a substituted or unsubstituted aryl or aralkyl group containing one or more benzenoid rings which may be fused or joined by single valency bonds and n is an integer of from about 5 to about 1500, and from about 95 to 5 parts by weight based on the total weight of the blend of a polyhydroxybutadiene homopolymer having the formula:

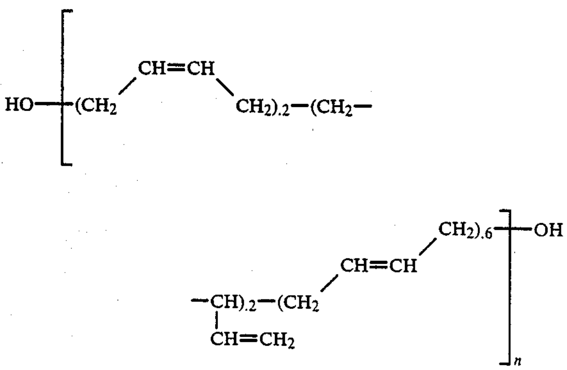

wherein n is as hereinabove described, with (b) an aliphatic or aromatic di- or polyisocyanate.

Part (a) of the two-component adhesive composition consists of an amine terminated polybutadiene such as, for example, n-butylamine, cyclohexylamine, phenylamine, t-butylamine and aminopropanetriethoxy silane termination, blended with a polyhydroxybutadiene sold commercially for example by the ARCO Chemical Company, a division of Atlantic Richfield Company, under the trademark "Poly bd" R-45HT or R-45M. The amount of amine terminated polybutadiene in the blend may be from about 5 to about 95 preferably about 25 to about 75 and most preferably 50 parts by weight based on the weight of the blend. The specific amount and type of amine terminated polybutadiene employed in the blend will be based on the type of di- or polyisocyanate (NCO) employed to give the polyurea/polyurethane adhesive composition. Blends with large amounts of n-butylamine terminated polybutadiene will generally be employed with a slower reacting diisocyanate such as for example isophorondiisocyanate. Excellent results for all blends are obtained with carbodiimide modified diphenylmethane diisocyanate (sold commercially as "Isonate 143-L" by the Upjohn Company) or similar diisocyanates. The ratio of the particular blends are generally adjusted according to the particular application, cure time required, temperature and other variables. The amount of reactant isocyanate used can also be varied depending on the nature and composition of the part (a) blend. For a blend with the larger amount of, for example, n-butylamine terminated polybutadiene having two (2) secondary amine (—R—NH) groups and an amine value of 0.80 meq/g., at least a stoichiometric amount corresponding to the isocyanate equivalent weight is most preferred, although in the broad practice of the invention, an amount of from about 0.80 to about 1.6 times the stoichiometric amount is generally satisfactory.

The amine terminated polybutadiene employed in the blends of the present invention to provide the adhesive composition are secondary or primary amine terminated polybutadiene compounds having the above noted formula wherein R is hydrogen, a straight or branched chain alkyl group containing from 1 to 10 carbon atoms or a substituted or unsubstituted aryl or aralkyl group containing one or more benzenoid rings which may be fused or joined by single valency bonds and n is an integer of from about 5 to 1500, and may be prepared by a two step process which comprises (1) reacting at a temperature of from about 15° C. to 150° C., optionally in the presence of a solvent, a polyhydroxybutadiene homopolymer with an alkane-or arenesulfonyl chloride or fluoride in the presence of a tertiary amine catalyst (which will react with generated hydrogen chloride to give a tertiary amine hydrochloride) to form an alkane-or arenesulfonate terminated polybutadiene and (2) reacting the formed alkane or arenesulfonate terminated polybutadiene in situ, or after removal from the reaction system with or without purification, at a temperature of from about 25° C. to 200° C. preferable 50° C. to 110° C. with a primary amine to form a secondary amine terminated polybutadiene or with ammonia at an initial ammonia pressure which will provide a stoichiometric amount, and preferably an excess of ammonia, to react with the sulfonate compound to form a primary amine terminated polybutadiene. Generally the ammonia pressures will range between about 200 psig and 500 psig. Optionally the process is carried out in the presence of an inert solvent.

The polyhydroxybutadiene homopolymers employed in the blends of the present invention will have the formula:

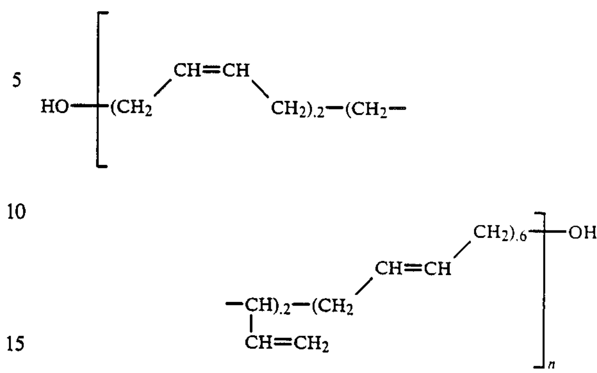

wherein n is an integer of from about 5 to about 1500 and a viscosity range of from about 20 to 300 or up to about 550 poises at 30° C. Preferably the homopolymers have a viscosity of about 35 to 60 or up to about 190 to 260 poises. Thus, the polyhydroxybutadiene homopolymers are liquid or semi-solids flowable, at least when subjected to moderate pressure, at ambient temperatures or at temperatures up to about 200° C. The hydroxyl-containing butadiene homopolymers will have molecular weights in the range of about 400 to 25,000 or higher as determined by cryoscopic, ebullioscopic or osomometric methods.

The polyhydroxybutadiene (hydroxy-containing butadiene homopolymers) employed in this invention differ from diene polymers known to be telechelic and/or hydroxy-containing in that the majority of unsaturation in the former is in the main hydrocarbon chain and in that the hydroxy components are in predominantly terminal positions on the main hydrocarbon chain and are predominantly primary and allylic in configuration. Ordinarily, at least about 1.8, often at least about 2 or more, frequently 2.1 to 2.8 and up to about 3 or more hydroxyl groups are present on the average per polymer molecule. Since these hydroxyl groups are predominantly primary, terminal and allylic in structure, with approximately two of the hydroxyl groups being at terminating positions on the main carbon chain, the polymers are highly reactive.

The dienes which are employed to make the polyhydroxybutadienes include the unsubstituted, 2-substituted or 2,3-disubstituted 1,3-dienes of 4 up to about 12 carbon atoms. The diene preferably has up to 6 carbon atoms and the substituents in the 2- and/or 3-position may be hydrogen, alkyl, generally lower alkyl, e.g., of 1 to 4 carbon atoms, aryl (substituted or unsubstituted), halogen, nitro, nitrile, etc. Typical dienes which may be employed are 1,3-butadiene, isoprene, chloroprene, 2-cyano-1,3-butadiene, 2,3-dimethyl-1,3-butadiene, 2phenyl-1,3-butadiene, 2-methyl3-phenyl-1,3-butadiene, etc.

Although polyhydroxybutadienes of the abovedescribed type, averaging more than one predominantly primary hydroxyl per molecule, say about 1.8 to 3 or more per molecule, may be employed in the process of this invention, they preferably have an average of at least 2 or more or about 2.1 to 2.4 up to 2.8 hydroxyl groups per molecule and the hydroxyl groups are predominantly in terminal allylic positions on the main, generally longest, hydrocarbon chain of the molecule. By "allylic" configuration is meant the alpha-allylic grouping of allylic alcohol; that is, the terminal hydroxyls of the intermediate polymer are attached to a carbon adjacent to a double-bond carbon.

The ratio of cis-1,4 and trans-1,4 and 1,2-vinyl unsaturation, generally as indicated in the formula at about 20%, about 60%, and about 20%, which occurs in the diene polymers employed in this invention, the number and location of the hydroxyl groups and the molecular weight of the polymers can be a function of polymerization temperature and the type of addition polymerization system employed in forming the polymer. It has been found that diene polymers of the desired configuration can be obtained using hydrogen peroxide as the catalyst for polymerization in a mutual solvent system. This free-radical addition polymerization usually takes place in solution at a temperature above about 100° C. to 200° C.

The reaction to form the polyhydroxybutadiene preferably takes place in a mutual solvent system; that is, one which dissolves both the diene monomer and the hydrogen peroxide. Sutiable solvents include isopropanol, methanol, sec-butanol, acetone, n-butanol, n-propanol, methyl ethyl ketone and the like, saturated alcohols or ketones preferably alkanols, having 2 to about 12 carbon atoms. The $H_2O_2$—solvent system is found to supply hydroxyl groups and the catalytic and solvent effects needed to produce the diene polymers of desired chemical and physical characteristics. In such a polymerization system the alcohol or ketone serves as a solvent for the peroxide and as a solvent or diluent for the diene monomer and is used in an amount suitable to promote adequately rapid but controllable polymerization of the monomer material in the solution to form the diene polymers. The solvent will be free of any group which would interfere with the production of the desired diene polymer. Saturated alcohols are preferred and often those having about the same carbon atom content as the diene monomer will be found most useful. Thus, propanol or isopropanol is often used in butadiene polymerization. The $H_2O_2$—solvent system may also contain ethers, alcohol-ketones, alcohol-ethers and alcohol-esters which are miscible in water in all proportions and which do not contain polymerizable carbon-to-carbon unsaturation or otherwise interfere with polymerization or enter into the product. The peroxide material may be used in amounts of about 1 percent to 15 percent of the reaction mixture to assure a low molecular weight addition polymer product having more than two hydroxyl groups per molecule.

The blends of the instant invention are normally prepared by physically mixing the desired proportions of polyhydroxybutadiene and amine terminated polybutadiene generally at ambient temperature although temperatures as high as about 100° C. may be used.

The organic polyisocyanates employed to react with the polyhydroxybutadiene/amine terminated polybutadiene blends at temperatures of from about 0° C. to about 50° C. preferably about 25° C. to about 35° C. according to the present invention include aliphatic, alicyclic and aromatic polyisocyanates characterized by containing two or more isocyanate groups. Such polyisocyanates include the diisocyanates and higher functionality isocyanates, particularly the aromatic aromatic polyisocyanates. Mixtures of polyisocyanates may be used which for example are the crude mixtures of di- and higher functionality polyisocyanates produced by phosgenation of aniline formaldehyde condensate or as prepared by the thermal decomposition of the corresponding carbamates dissolved in a suitable solvent as described in U.S. Pat. Nos. 3,962,302 and 3,919,279 both known as crude MDI or PMDI. The organic polyisocyanate may be isocyanate-ended prepolymers made by reacting under standard known connditions, an excess of a polyisocyanate with a polyol which on a polyisocyanate to polyol basis may range from about 20:1 to 2:1 and include for example polyethylene glycol, polypropylene glycol, diethylene glycol monobutyl ether, ethylene glycol monoethyl ether, triethylene glycol, etc. as well as glycols or polyglycols partially esterified with carboxylic acids including polyester polyols and polyether polyols. The organic polyisocyanates or isocyanate terminated prepolymer may also be used in the form of an aqueous emulsion by mixing such materials with water in the presence of an emulsifying agent. The isocyanates may also contain impurities or additives such as carbodiimides, isocyanurate groups, urea, hydrolyzable chlorides and biurets as well as certain release agents. Illustrative of such di- or polyisocyanates which may be employed include, for example, toluene-2,4- and 2,6-diisocyanates or mixtures thereof, diphenylmethane-4,4'-diisocyanate (a solid) and diphenylmethane-2,4'-diisocyanate (a solid) or mixtures of same, i.e., containing about 10 parts by weight 2,4'- or higher, which are liquid at room temperature, polymethylene polyphenyl isocyanates, naphthalene-1,5-diisocyanate, 3,3'-dimethyl diphenylmethane-4,4'diisocyanate, triphenylmethane triisocyanate, hexamethylene diisocyanate, 3,3'-ditolylene-4,4-diisocyanate, butylene 1,4-diisocyanate, octylene-1,8-diisocyanate, 4-chloro-1,3-phenylene diisocyanate, 1,4- 1,3- and 1,2-cyclohexylene diisocyanates and in general the polyisocyanates disclosed in U.S. Pat. No. 3,577,358. The preferred polyisocyanates are the diphenylmethane diisocyanate 2,4' and 4,4' isomers including the 2,2' isomer and the higher functional polyisocyanate and polymethylene polyphenyl isocyanate mixtures, which may contain from about 20 to 85 weight percent of the diphenylmethane diisocyanate isomers. Typical of the isocyanates employed with the blends to prepare the polyurea/polyurethanes are sold commercially for example as "Isonate 143-L" by the Upjohn Company which is a carbodiimide modified diphenylmethane diisocyanate. In general the organic polyisocyanates will have a molecular weight in the range of about 100 and 10,000 and will be employed in amounts of from about 10 to 50 parts by weight preferably 15 to 25 parts by weight based on the active hydrogen content contained in the blend including chain extenders, if any. Excess amounts of the isocyanates may be employed if desired.

The adhesive systems of the present invention generally do not require any catalyst when reacted with the polyisocyanates. However, if necessary suitable polyurea/polyurethane catalysts which are compatible with the blend system may be used. The amount of catalyst used may be from about 0.02% to about 2% preferably from about 0.05% to about 1% by weight based on the weight of the polyhydroxybutadiene/amine terminated polybutadiene blend. Representative catalysts include, for example, monoalkoxy and neoalkoxy titanates, organometallic compounds and tertiary amines such as isopropyl tri (N-ethylaminoethyamino) titanate, tetra (2-diallyloxymethyl-1-butoxy titanium, di(ditridecyl) phosphite, tetramethylaminopropyl isopropylamine, 1,4-diazabicyclo(2,2,2) octane (DABCO), stannous octoate, 1,3-Bis (dimethylamino)2-propanol and the like.

When the blends of the present invention are reacted with the di- or polyisocyanates, chain extenders, if desired, may be employed with the part (a) blend component in varied amounts over any convenient range depending on the particular polyisocyanate employed and the composition of the blend of polyhydroxybutadiene and amine terminated polybutadiene. The amount of chain extender to be used in the present invention is based on the type and functionality of the amine terminated polybutadiene employed. In general, from about 1 to about 15 parts by weight for blends having up to about 80% amine terminated polybutadiene may be added. It is most convenient to use about 1 to 3 parts by weight for systems reacted, for example with carbodiimide modified diphenylmethane diisocyanate and up to about 10 parts by weight with less reactive isocyanates such as isophorondiisocyanate and crude diphenylmethane diisocyanate. Representative chain extenders which may be employed include, for example, 1-methyl-3,5-diethyl-2,6-diaminobenzene, 1-methyl-3, 5-diethyl-2,4-diaminobenzene, 2,4- and 2,6-diaminotoluenes, 1,3,5-triethyl-2,6-diaminobenzene, 3,5,3',5'-tetraethyl-4,4'diaminodiphenylmethane, 4,4'-diaminodiphenylmethane, 1,3-phenylenediamine, 1,4-phenylenediamine, triphenylmethane-4,4'4''-triamine, 2,4-diaminomesitylene, 4-aminophenyl sulfone, methylene-bis-(dipropylaniline) as well as N,N-bis [2-hydroxypropyl] aniline a short chain diol chain extender sold commercially as "Isonol" 100 by Upjohn Company) mixtures thereof and the like.

The amine terminated polybutadienes are miscible in all proportions with polyhydroxybutadiene such as for example "Poly bd" R-45HT, at all operating temperatures. High speed mixing or reaction injection molding (RIM) can conveniently employ blends in any accessible range. Elastomer sheets prepared from blends exhibit only a 1 to 5% loss in physical and mechanical properties upon storage at 120° C. as compared to sheets prepared with 100% "Poly bd" R45HT. All blends are storage stable at ambient temperatures.

As indicated hereinabove, inert fillers may be added to the composition to achieve desired viscosity, adhesion and other properties. Typical fillers and the amounts which are generally employed per 100 parts of the part (a) blend include, for example, carbon black (~5-25 parts), silica and fumed silica ("Cab-O-Sil N70 TS") (~5-75 parts) and calcium carbonate (~5-25 parts).

Tackifiers and plasticizers in amounts of from about 5 to about 50 and about 5 to about 20 parts per 100 parts of blend (a) respectively may also be employed where desired. Typical tackifiers include for example the rosin esters such as "Foral 85" sold by Hercules, Inc. and "Zonesters" sold by Arizona Chemical, "Nevchem" 100 (Neville Chemical Co.) aromatic indene-styrene type resins and "Hercotac AD-1100" (Hercules, Inc.) mixed aliphatic-aromatic resins.

Plasticizers include, for example adipate and phthalate esters, aromatic or naphthenic extending oils and aromatic sulfonamides such as a mixture N-ethyl o&p-toluenesulfonamides sold commercially as "Santicizer 8" by Monsanto Industrial Chemical Company.

In the end-use adhesive application of the compositions, the time required to cure the polyurea/polyurethane adhesive of the instant invention will depend on the temperature and shape of the substrate material as well as the heat transfer media employed for imposing elevated temperature curing conditions on the adhesive film. In a broad practice of the system of the instant invention, the adhesive may be cured either at room temperature (~25°-30° C.) for periods of from about 24 to 48 hours or more quickly at temperatures of, for example, from about 50° C. to about 150° C. for a period of about 10 to 20 minutes.

The present invention is more fully illustrated by the following examples, which include particular features of the invention. However, the examples are not to be construed as limiting the invention in any way, it being understood that numerous variations are possible without departing from the spirit and scope of the invention.

EXAMPLE 1

Part (a) of the two-component adhesive system was prepared by mixing together 60 g polyhydroxybutadiene ("Poly bd" R-45 HT) resin, 40 g of cyclohexylamine terminated polybutadiene and 26 g of resin ester tackifier ("Foral 85") and heating to 100° C. for 20 minutes under vacuum. 5 g of fumed silica ("Cab-O-Sil" N-70TS), 10 g carbon black, 3 g of diethyltoluene diamine and 0.2 g isopropyltriisostearoyltitanate coupling agent ("KRTTS" of KenRich Petrochemical) was added and stirred for 10 minutes under vacuum. Part (b) which was 17 g of carbodiimide modified diphenylmethane diisocyanate ("Isonate 143-L"- Upjohn Company) with an NCO to active hydrogen ratio of 1.0 was added under vacuum and the mixture stirred for 3-4 minutes. The adhesive was applied to one end of each of two pieces of cold rolled steel (1"×5"×0.06") to obtain a bondline of 0.01 inch. The treated ends of the two pieces of steel were overlapped one (1) inch, allowed to set at room temperature for 1 hour and then cured for 2 hours at 100° C. The lap shear tensile strength was measured by an Instron tensile tester showing a lap shear strength of 1000 psi.

EXAMPLE 2

The procedure of Example 1 was repeated with the addition of 2 g of N,N-bis[2-hydroxypropyl] aniline ("Isonal 100"-Upjohn Company) to the part (a) side. Following the same procedure as in Example 1, a lap shear tensile strength of 1400 psi was obtained.

EXAMPLE 3

50 g of the part (a) component of Example 1 was mixed with 0.01 g isopropyl tri (N-ethylaminoethylamino) titanate catalyst ("KR44" of KenRich Petrochemical) and 10 g of "Isonate 143L" under vacuum at room temperature. The adhesive was applied to one end of each of two pieces of cold rolled steel, one being 1"×6"×0.06" and the other 1"×6"×0.01", to obtain a bondline thickness of 1/16". The treated ends were overlapped 2½" and allowed to stand at room temperature for 1 hour and cured at 100° C. for two hours. Lapshear samples were also prepared and tested as in Example 1. Testing with the Instron gave a lap shear strength of 1900 psi and a peel strength of 100 pli (Pounds linear inch).

EXAMPLE 4

The procedure of Example 3 was repeated except that 12.84 g of "Isonate 143-L" with an NCO to active hydrogen ratio of 1.3 was employed in part (b). Test results gave a peel strength of 112 pli and a lap shear tensile strength of 2500 psi.

EXAMPLE 5

Example 4 was repeated except that the isocyanate index ("Isonate-143L") was changed from 1.3 to a 1.5 NCO to active hydrogen ratio and the bonded steel samples cured at 120° C. for 2 hours following the procedure of Examples 1 and 3. Instron testing gave a lap shear strength of 2800 psi and a peel strength of 85 pli.

EXAMPLE 6

The adhesive composition of Example 5 was applied onto oily uncleaned cold rolled steel plates and the pieces overlapped as in Example 3 and cured at 120° C. for 2 hours. A lap shear strength of 2400 was obtained.

EXAMPLE 7

A mixture of 60 g of "Poly bd" R-45HT, 40 g cyclohexylamine terminated polybutadiene, 3 g 4-aminophenylsulfone chain extender, 2 g "Isonol-100", 25 g "Foral 85", 10 g carbon black, 5 g silica and 0.2 g "KRTTS" was prepared as in Example 1. To this mixture was added 26 g "Isonate-143-L". The adhesive was applied as in Example 1 onto steel substrates and cured for 3 hours at 120° C. Testing was conducted at sub-zero temperatures. At −40° C. a lap shear strength of 2600 psi and a peel strength of 135 pli were obtained.

EXAMPLE 8

The procedure of Example 2 was followed except that a phenylamine terminated polybutadiene with 5% polyhydroxybutadiene was employed. Following the steel strip preparation and testing procedure of Example 1, a lap shear strength of 2200 psi and peel strength of 80 pli were obtained.

EXAMPLE 9

A mixture of 50 g of n-butylamine terminated polybutadiene (Arco Chemical Company), 50 g of "Poly bd" R45HT, 2 g diethyltoluenediamine, 20 g "Foral 85" and 0.01 g of "KR44" catalyst was prepared (component a) as in Example 1. 18 g "Isonate 143-L", 4 g of N-ethyl o and p-toluenesulfonamide plasticizer ("Santicizer 8" of Monsanto Company) and 4 g of fumed silica (component b) was added to part (a) and thoroughly mixed. The adhesive was applied to steel substrates as in Example 1 and cured at 100° C. for 2 hours. Instron testing gave a lap shear tensile strength of 2400 psi and a peel strength of 75 pli.

EXAMPLE 10

The procedure of Example 1 was repeated except that the amount of cyclohexylamine terminated polybutadiene was reduced from 40 g to 25 g to give a 75:25 parts by weight blend of "Poly bd" R-45HT to cyclohexylamine terminated polybutadiene respectively. The adhesive was applied to steel substrates, cured and Instron tested as in Example 1. a lap shear strength of 900 psi was obtained.

EXAMPLE 11

The procedure of Example 1 was repeated except that the amount of cyclohexylamine terminated polybutadiene was increased from 40 g to 70 g by weight to give a 30:70 parts by weight blend of "Poly bd" R-45HT to cyclohexylamine terminated polybutadiene respectively. The adhesive was applied to steel substrates, cured and tested as in Example 1. A lap shear strength of 1350 psi was obtained.

We claim:

1. A heat-curable two-component polyurea/polyurethane adhesive composition comprising the reaction product of (a) a blend of from about 5 to about 95 parts by weight based on the total weight of the blend of an amine terminated polybutadiene having the formula:

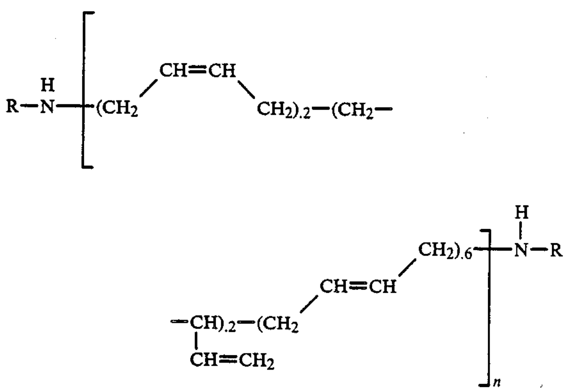

wherein R is hydrogen, a straight or branched chain alkyl group containing from 1 to 10 carbon atoms or a substituted or an unsubstituted aryl or aralkyl group containing one or more benzenoid rings which may be fused or joined by single valency bonds and n is an integer of from about 5 to about 1500, and from about 95 to 5 parts by weight based on the total weight of the blend of a polyhydroxybutadiene homopolymer having the formula:

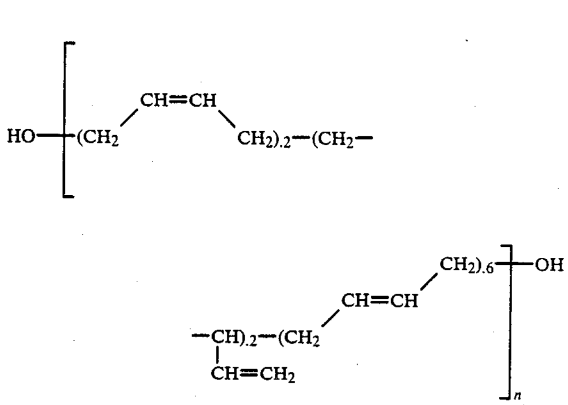

wherein n is as hereinabove described, with (b) an aliphatic or aromatic di-or polyisocyanate.

2. The adhesive composition of claim 1 wherein the amine terminated polybutadiene is a cyclohexylamine terminated polybutadiene.

3. Th adhesive composition of claim 1 wherein the amine terminated polybutadiene is an n-butylamine terminated polybutadiene.

4. The adhesive composition of claim 1 wherein the amine terminated polybutadiene is a phenylamine terminated polybutadiene.

5. The adhesive composition of claim 1 wherein the di- or polyisocyanate is a carbodiimide modified diphenylmethane diisocyanate.

6. The adhesive composition of claim 1 wherein the amine terminated polybutadiene is between about 25 and 75 parts by weight of the blend.

7. The adhesive composition of claim 6 wherein the amine terminated polybutadiene is 50 parts by weight of the blend.

8. The adhesive composition of claim 1 wherein from about 0.02% to about 2.0% by weight of the blend of a catalyst is added to the composition.

9. The adhesive composition of claim 1 wherein from about 1 to about 15 parts by weight of a chain extender is added to the part (a) blend.

10. A process of bonding substrate workpieces with a polyurea/polyurethane adhesive comprising applying a wet film of said polyurea/polyurethane composition of claim 1 interposed between and in contact with said substrate workpiece and curing same at temperatures of from about 25° C. to about 150° C. to form a solid polyurea/polyurethane adhesive film adhesively bonding said substrate workpieces to one another.

* * * * *